(12) United States Patent
Kim et al.

(10) Patent No.: US 11,749,023 B2
(45) Date of Patent: Sep. 5, 2023

(54) APPARATUS AND METHOD FOR MONITORING USER BASED ON MULTI-VIEW FACE IMAGE

(71) Applicant: Electronics and Telecommunications Research Institute, Daejeon (KR)

(72) Inventors: Ho-Won Kim, Seoul (KR); Jang-Hee Yoo, Daejeon (KR); Byung-Ok Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 151 days.

(21) Appl. No.: 17/085,941

(22) Filed: Oct. 30, 2020

(65) Prior Publication Data

US 2021/0374402 A1 Dec. 2, 2021

(30) Foreign Application Priority Data

May 26, 2020 (KR) ........................ 10-2020-0062912

(51) Int. Cl.
*G06V 40/19* (2022.01)
*G06F 3/01* (2006.01)
*G06N 3/088* (2023.01)

(52) U.S. Cl.
CPC .............. *G06V 40/19* (2022.01); *G06F 3/012* (2013.01); *G06F 3/013* (2013.01); *G06N 3/088* (2013.01)

(58) Field of Classification Search
CPC ......... G06V 40/19; G06F 3/012; G06F 3/013; G06N 3/088
USPC ........................................................ 382/103
See application file for complete search history.

(56) References Cited

U.S. PATENT DOCUMENTS

| 10,282,530 B2 * | 5/2019 | Gordon ................. G06F 21/316 |
| 2012/0106785 A1 * | 5/2012 | Karafin .................. G06T 11/00 382/164 |
| 2015/0178554 A1 * | 6/2015 | Kanaujia ................ G06V 10/60 382/118 |

(Continued)

FOREIGN PATENT DOCUMENTS

| KR | 1020070039290 A | 4/2007 |
| KR | 1020170098136 A | 8/2017 |

(Continued)

OTHER PUBLICATIONS

Kang Il Bae et al., Multi-view learning review: understanding methods and their application, The Korean Journal of Applied Statistics (2019), DOI: https://doi.org/10.5351/KJAS.2019.32.1.041, pp. 41-68.

*Primary Examiner* — Gabriel I Garcia
(74) *Attorney, Agent, or Firm* — William Park & Associates Ltd.

(57) ABSTRACT

Disclosed herein are an apparatus and method for monitoring a user based on multi-view face images. The apparatus includes memory in which at least one program is recorded and a processor for executing the program. The program may include a face detection unit for extracting face area images from respective user images captured from two or more different viewpoints, a down-conversion unit for generating at least one attribute-specific 2D image by mapping information about at least one attribute in the 3D space of the face area images onto a 2D UV space, and an analysis unit for generating user monitoring information by analyzing the at least one attribute-specific 2D image.

14 Claims, 8 Drawing Sheets

(56) References Cited

U.S. PATENT DOCUMENTS

| | | | |
|---|---|---|---|
| 2019/0026917 A1* | 1/2019 | Liao | G06V 20/00 |
| 2019/0213314 A1 | 7/2019 | Gordon | |
| 2019/0371051 A1* | 12/2019 | Dore | G06T 17/00 |
| 2021/0004633 A1* | 1/2021 | Shacham | G06T 5/20 |

FOREIGN PATENT DOCUMENTS

| | | |
|---|---|---|
| KR | 101793510 B1 | 11/2017 |
| KR | 1020170128929 A | 11/2017 |
| KR | 1020180037436 A | 4/2018 |
| KR | 1020190022627 A | 3/2019 |
| KR | 1020190105011 A | 9/2019 |

* cited by examiner

APPARATUS AND METHOD FOR MONITORING USER BASED ON MULTI-VIEW FACE IMAGE

CROSS REFERENCE TO RELATED APPLICATION

This application claims the benefit of Korean Patent Application No. 10-2020-0062912, filed on May 26, 2020, which is hereby incorporated by reference in its entirety into this application.

BACKGROUND OF THE INVENTION

1. Technical Field

The disclosed embodiment relates to technology for monitoring a user for interaction with the user.

2. Description of the Related Art

User information collected in real time through multi-view face image analysis may be used for providing an intelligent interactive service suitable for a user context in various fields in which face-to-face service or user-monitoring service is performed based on artificial intelligence (AI), such as an AI secretary or AI tutor, an AI access system, an AI signage system, an AI service robot, an AI concierge/robot/curation system, a CCTV-monitoring system, and the like.

Conventional methods use sensors, such as microphones, cameras, and the like, such that a computer is capable of automatically analyzing or recognizing the intention, state, purpose, or the like of a user from voice or images in order to interact with the user.

Such conventional methods include various approaches for determining the identity, gaze direction, expression, posture, and the like of a user using information acquired from cameras, such as an RGB camera (e.g., webcam) through which color information, such as the skin color of the user or the like, can be acquired, a depth camera (e.g., Kinect) through which the shape or geometry information of the user can be acquired, and the like. In the case of conventional commercial systems for the above-described purposes, such as face recognition, eye tracking, or the like, a user is mostly required to look straight at a camera in order to acquire as much information as possible from the user. When the user does not follow this restriction, such systems do not work properly, or the performance thereof is degraded. That is, when the user looks at a camera from an angle of 45 degrees or more relative to the camera, the eye movement, a change in a facial expression, and face features on one side of a face hidden from a camera view cannot be acquired from a camera image, and it is difficult to collect correct user information due to the absence of such information.

In order to make it possible for a computer to acquire information in the hidden region that cannot be acquired using a single camera, there are methods of arranging multiple cameras in different positions based on a user in order to look at the user from different viewpoints and performing image analysis by acquiring multi-view images from the multiple cameras. In this case, due to the excessive amount of information, a method for selecting a camera view including required information and efficiently collecting image information from the camera view is required. That is, in an extreme case, among two cameras directed to a user, the first camera may provide information about only the right side of a face because the left side is hidden, and the second camera may provide information about only the left side of the face because the right side is hidden. In this case, there is a problem with regard to how to combine information from the first camera with information from the second camera in order to efficiently acquire information about the user.

A conventional computational photography approach mainly uses a method in which, after information acquired from multi-view images is reconstructed in 3D based on camera calibration for transforming the geometrical relationship between a user and respective cameras, the information is collected and analyzed in the 3D space. In this case, there are problems of a high computational load, operational instability caused when there is no overlapping region between multi-view images, degradation of the reliability of data in the overlapping region, and the like. Further, in order to solve these problems, additional operations are required. These problems may be exacerbated in an embedded environment, such as a mobile device, a robot, or the like.

As another conventional approach, there is a method using deep learning, but this method is mostly for processing a single-view image, rather than processing of multi-view images. Also, the approach using a single-view image has a disadvantage in that a user cannot behave naturally during interaction because the user is required to look straight ahead, as described above.

SUMMARY OF THE INVENTION

An object of the disclosed embodiment is to enable monitoring of a user even when the user takes a free pose including looking at a camera from an angle of 45 degrees or more relative to the camera, rather than being in a general frontal view state in which the user looks straight at the camera or looks at the camera from an angle less than 45 degrees relative to the camera.

Another object of the disclosed embodiment is to solve the problem of an excessive amount of information when a user is monitored based on a plurality of multi-view images.

A further object of the disclosed embodiment is to solve the problem of a high computational load imposed by monitoring a user using a 3D spatial operation.

Yet another object of the disclosed embodiment is to enable a deep-learning operation to be applied even when a user takes a free pose including looking at a camera from an angle of 45 degrees or more relative to the camera, rather than being in a general frontal view state in which the user looks straight at the camera or looks at the camera from an angle less than 45 degrees relative to the camera.

An apparatus for monitoring a user based on multi-view face images according to an embodiment may include memory in which at least one program is recorded and a processor for executing the program. The at least one program may include a face detection unit for extracting face area images from respective user images captured from two or more different viewpoints, a down-conversion unit for generating at least one attribute-specific 2D image by mapping information about at least one attribute in the 3D space of the face area images onto a 2D UV space, and an analysis unit for generating user monitoring information by analyzing the at least one attribute-specific 2D image.

Here, the program may further include a target user selection unit for selecting a monitoring-target user from the extracted face area images after extraction of the face area images and before generation of the user monitoring information.

Here, the program may determine whether users included in the user images captured from the two or more different viewpoints are the same user based on a convolutional neural network.

Here, the down-conversion unit may be generated based on a convolutional neural network algorithm, and may include an encoder for parameterizing characteristics extracted from the face area images and a decoder for generating the at least one attribute-specific 2D image based on characteristic parameters.

Here, the attribute-specific 2D image may include a shape 2D image (uv_shape) in which shape information in the 3D space of the face area images is stored in a color code format and a color 2D image (uv_tex) in which color information of the face area images is stored.

Here, the down-conversion unit may further include a latent layer for extracting at least one of the characteristic parameters, including a shape parameter, an expression parameter, an illumination parameter, and a head pose parameter, by additionally transforming or processing the characteristic parameters for each characteristic.

Here, the analysis unit may include at least one of an identity recognition unit for identifying the user based on the similarity between the attribute-specific 2D image and an attribute-specific 2D image that is previously registered for each user, a face feature detection unit for detecting a face feature based on the comparison of the attribute-specific 2D image with an attribute-specific 2D image of a standard face type, a head gesture classification unit for detecting a head gesture based on the head pose parameter, a gaze detection unit for detecting a 3D gaze direction based on the head pose parameter and the color value of an eye area in uv_tex, and an emotional state recognition unit for recognizing the emotional state of the user based on variation in the attribute-specific 2D image over time.

A convolutional-neural-network learning device according to an embodiment may include memory in which at least one program is recorded and a processor for executing the program. Here, the program may perform supervised learning such that the convolutional neural network, receiving face area images, outputs at least one attribute-specific 2D image corresponding to a 2D UV space onto which information about at least one attribute in a 3D space is mapped, and may perform unsupervised learning so as to minimize the difference between multi-view face color images and rendered multi-view color images acquired by rendering the attribute-specific 2D image that is output from the convolutional neural network trained through supervised learning by inputting the multi-view face color images thereto.

Here, the supervised learning may be performed to train the convolutional neural network so as to output at least one of characteristic parameters, including an illumination parameter and a head pose parameter, by additionally transforming or processing the characteristic parameters, extracted from the face area images, for each characteristic, and the unsupervised learning may be performed to perform rendering by receiving the illumination parameter and the head pose parameter along with the multi-view face color images.

Here, the unsupervised learning may be performed based on a Generative Adversarial Network (GAN) algorithm.

A method for monitoring a user based on multi-view face images according to an embodiment may include extracting face area images from respective user images captured from two or more different viewpoints, transforming information about at least one attribute in the 3D space of the face area images to at least one attribute-specific 2D image by mapping the information onto a 2D UV space, and generating user monitoring information by analyzing the at least one attribute-specific 2D image.

Here, the method may further include, after extracting the face area images and before generating the user monitoring information, selecting a monitoring-target user from the extracted face area images.

Here, the method may further include determining whether users included in the user images captured from the two or more different viewpoints are the same user based on a convolutional neural network.

Here, transforming the information about the at least one attribute in the 3D space may be performed based on an algorithm of a convolutional neural network, and may include parameterizing characteristics extracted from the face area images and generating the at least one attribute-specific 2D image based on characteristic parameters.

Here, the attribute-specific 2D image may include a shape 2D image (uv_shape), in which shape information in the 3D space of the face area images is stored in a color code format, and a color 2D image (uv_tex), in which color information of the face area images is stored.

Here, transforming the information about the at least one attribute in the 3D space may further include extracting at least one of the characteristic parameters, including a shape parameter, an expression parameter, an illumination parameter, and a head pose parameter, by additionally transforming or processing the characteristic parameters for each characteristic.

Here, generating the user monitoring information may include at least one of identifying the user based on the similarity between the attribute-specific 2D image and an attribute-specific 2D image that is previously registered for each user, detecting a face feature based on the comparison of the attribute-specific 2D image with an attribute-specific 2D image of a standard face type, detecting a head gesture based on the head pose parameter, detecting a 3D gaze direction based on the head pose parameter and the color value of an eye area in uv_tex, and recognizing the emotional state of the user based on variation in the attribute-specific 2D image over time.

Here, the convolution neural network may be generated by performing supervised learning such that the convolutional neural network, receiving the face area images, outputs the at least one attribute-specific 2D image corresponding to the 2D UV space onto which the information about the at least one attribute in the 3D space is mapped, and may be generated by performing unsupervised learning so as to minimize the difference between multi-view face color images and rendered multi-view color images acquired by rendering the attribute-specific 2D image that is output from the convolutional neural network trained through supervised learning by inputting the multi-view face color images thereto.

Here, performing the supervised learning may be configured to train the convolutional neural network so as to output at least one of the characteristic parameters, including an illumination parameter and a head pose parameter, by additionally transforming or processing the characteristic parameters, extracted from the face area images, for each characteristic, and performing the unsupervised learning may be configured to perform rendering by inputting the illumination parameter and the head pose parameter along with the multi-view face color images.

Here, the unsupervised learning may be performed based on a Generative Adversarial Network (GAN) algorithm.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
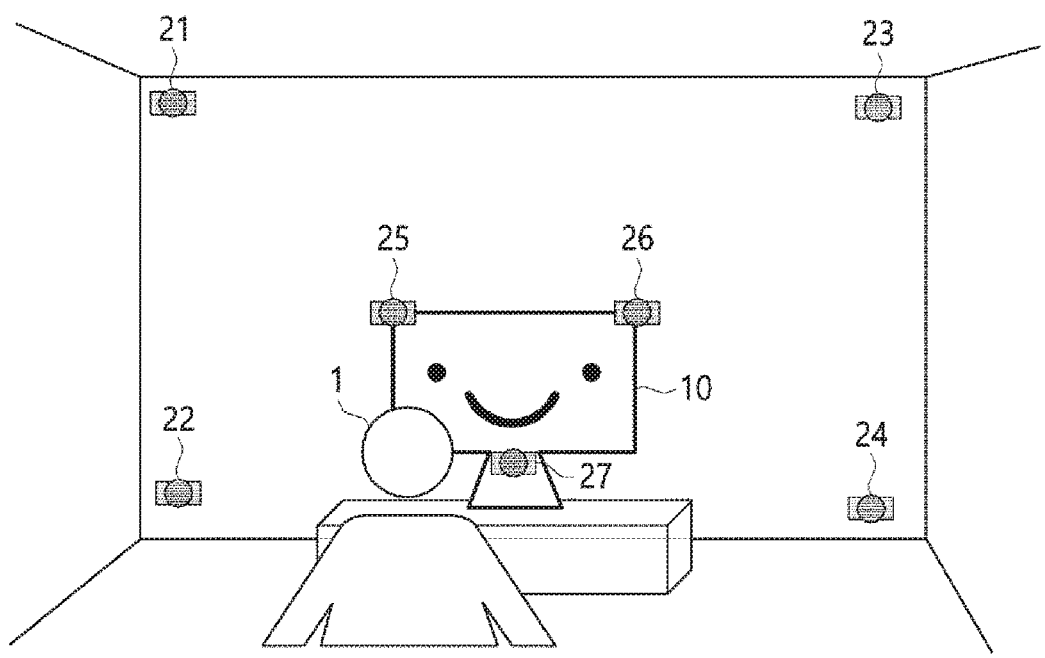
FIG. 1 is an exemplary view for explaining an environment in which an apparatus for monitoring a user based on multi-view face images is installed according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including" when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for monitoring a user based on multi-view face images according to an embodiment will be described in detail with reference to FIGS. 1 to 9.

An embodiment relates to technology for monitoring a user based on multi-view face images in order to perform intelligent interaction with the user in a face-to-face Artificial intelligence (AI) service based on information, e.g., the identity of the user, characteristics, such as a face shape, information about whether the user wears glasses, and the like, the emotional state of the user recognized based on an expression, the intention of the user detected through a gaze direction or a gesture, and the like, which can be acquired by collecting and analyzing multi-view or multi-viewpoint face images of the user acquired using an image sensor installed in a computer, a tablet PC, a mobile phone, a robot or the like or image sensors arranged in a space.

Specifically, the embodiment relates to technology for acquiring user information for intelligent interaction suitable for the context of a user using learning-based image analysis technology by automatically analyzing self-occlusion, which is caused due to the viewpoint of a camera relative to that of the user, based on a deep-learning method in user images captured from two or more different viewpoints, transforming three-dimensional (3D) information of the user, e.g., a face shape, a head pose, a gaze direction, an expression, and the like included in the multi-view images, onto a 2D space without information loss through dimensionality reduction, and inferring the user information in real time through 2D image analysis.

FIG. 1 is an exemplary view for explaining an environment in which an apparatus for monitoring a user based on multi-view face images is installed according to an embodiment.

Referring to FIG. 1, a computer 10 for performing intelligent interaction with a user 1 based on AI, such as an AI secretary or the like, may perform intelligent interaction with the user according to the emotional state or intention of the user by automatically collecting and analyzing information, including the identity, characteristics, gaze direction, gesture, expression, and the like of the user, in real time using multi-view image information input from cameras 21 to 27, which are embedded in the computer or arranged in a space in order to observe the user 1 from different viewpoints under the control of the computer.

Currently, not only smartphones or mobile terminals but also various kinds of computer terminals capable of providing a user interaction service based on computation capabilities, such as vehicles, robots, and the like, increasingly provide user-customized intelligent services by analyzing image information acquired by capturing images of a user using cameras, such as a webcam, a Kinect, and the like. Accordingly, there is an increasing number of cases of installing multiple cameras and simultaneously using the same, departing from the use of only a single camera, and systems are being changed in order to support management of multiple cameras at the platform level.

Multi-view images may be simultaneously input from the multiple cameras 21 to 27 arranged in the same space, as shown in FIG. 1. Alternatively, images captured by multiple cameras distributed in the space, such as CCTVs, at different times may be acquired, or after images of a user who takes multiple poses are successively captured using a single camera, multi-view images may be acquired using the viewpoint of the camera relative to that of the user. That is, multi-view images may be acquired from systems including various kinds of commercially available smart terminals, robots, and the like, and when multiple cameras are simultaneously used, it is possible to monitor the user without self-occlusion and information loss incurred by the difference in data acquisition times.

When multi-view cameras are used, even though a user continuously moves, information lost due to self-occlusion, which is caused according to the viewpoint of a camera relative to that of the user, can be acquired from another camera from a different viewpoint. Therefore, a computer may acquire user image information without loss even though a user moves under various conditions. However, in the process of extracting necessary information from multi-view image information, it is necessary to consider a method for detecting self-occlusion caused by a user and processing image information acquired from two or more views. In this case, such processing mostly requires not only image-based 3D reconstruction, which is mainly researched in a computer-vision field, but also analysis of 3D information between a user and multi-view cameras, and a considerable amount of computation is required therefor. Therefore, it is difficult to apply this technique to real-time service on mobile platforms or the like.

Therefore, an embodiment proposes technology for enabling real-time user-monitoring even in an embedded environment in such a way that, when multi-view face images are input in order to make a request to analyze a 3D space of the multi-view images, 3D image analysis is replaced with 2D image analysis through dimensionality-reduction learning, through which the 3D space can be represented in a 2D form in a UV space using a deep-learning method based on a Convolutional Neural Network (CNN).

Figure 2:
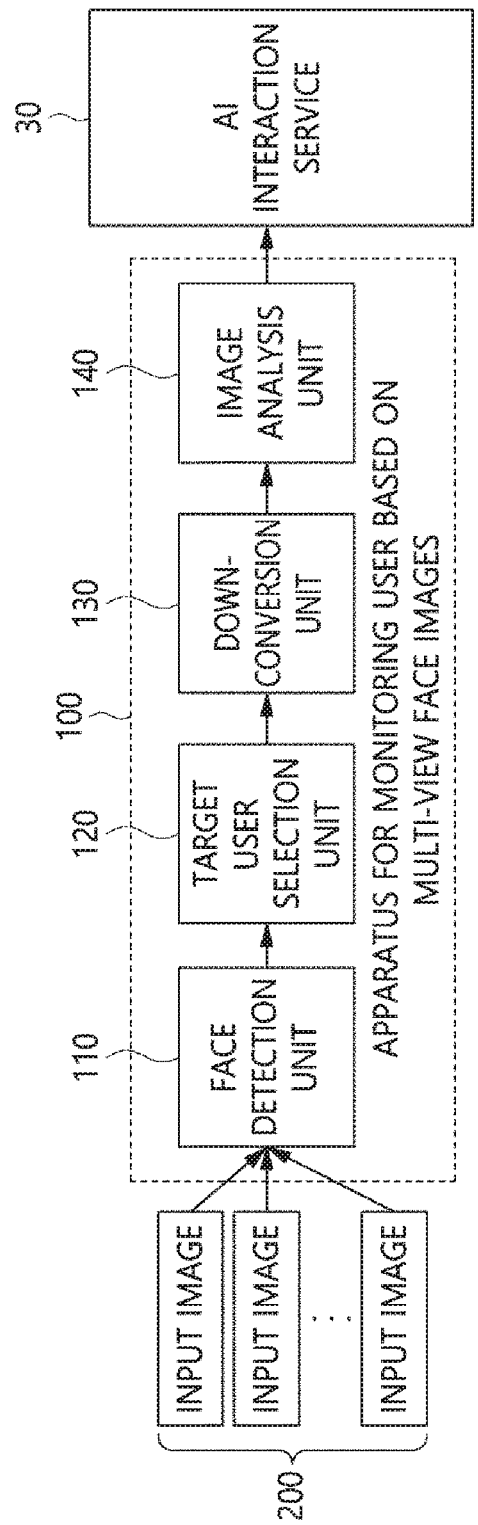
FIG. 2 is a schematic block diagram of an apparatus for monitoring a user based on multi-view face images according to an embodiment.
Figure 3:
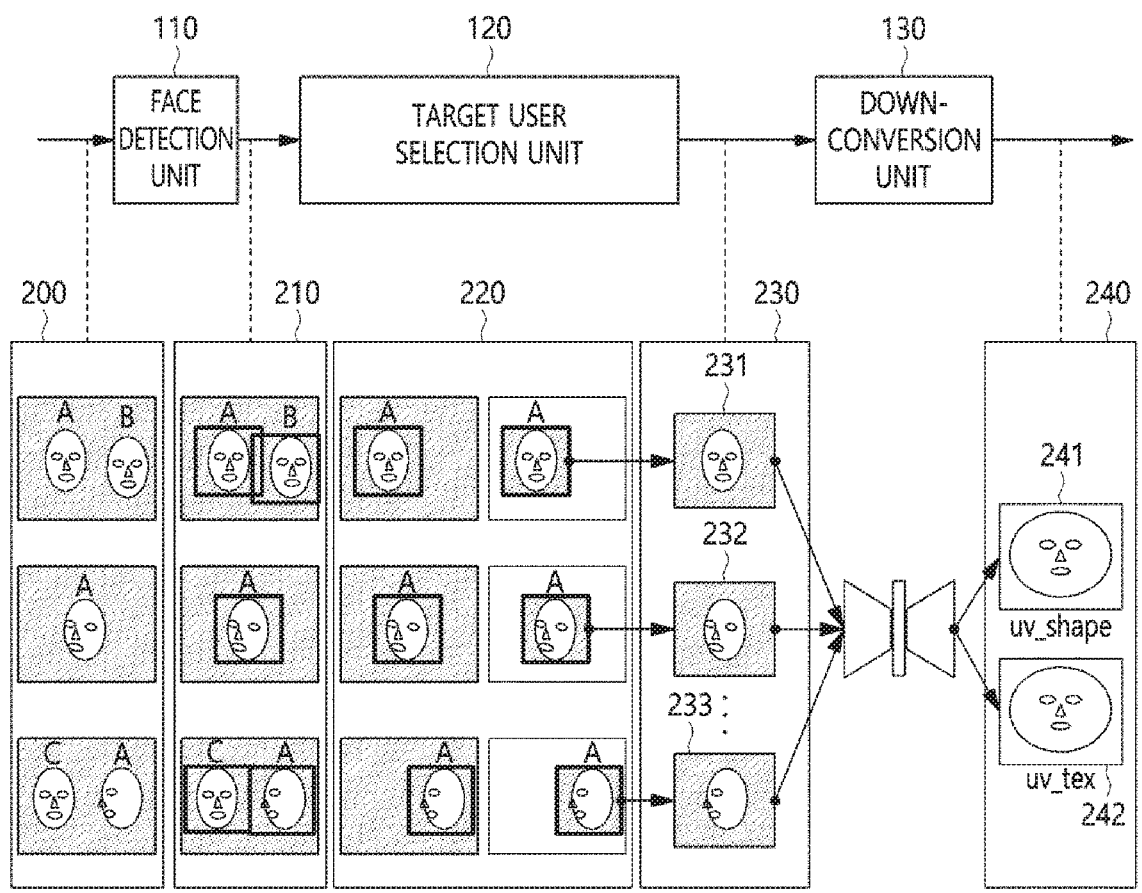
FIG. 3 is an exemplary view illustrating multi-view images processed in an apparatus for monitoring a user based on multi-view face images according to an embodiment.

FIG. 2 is a schematic block diagram of an apparatus for monitoring a user based on multi-view face images according to an embodiment, and FIG. 3 is an exemplary view illustrating multi-view images processed by an apparatus for monitoring a user based on multi-view images according to an embodiment.

Referring to FIG. 2, the apparatus 100 for monitoring a user based on multi-view face images includes a face detection unit 110, a down-conversion unit 130, and an analysis unit 140. Additionally, the apparatus 100 may further include a target user selection unit 120.

The face detection unit 110 extracts face area images from respective user images captured from two or more different viewpoints.

Here, the user images may be acquired by multiple cameras installed at different positions. Alternatively, the user images may be acquired by a single camera according to the movement of the user.

Here, the face detection unit 110 may be implemented using any of various face detectors within the range of ordinary skill, such as a Single-Shot Detector (SSD) or the like.

The target user selection unit 120 may select a monitoring-target user from the extracted face area images.

For example, referring to FIG. 3, each of the multiple user images 200 may include multiple different users, A, B and C. In this case, the face detection unit 110 detects the face area images 210 of all of the users A, B and C from the user images 200. Accordingly, the target user selection unit 120 selects only the face area image 230 of a monitoring-target user (e.g., the user A) from among the face area images detected by the face detection unit 110.

Here, the target user selection unit 120 may select only the face area image of the monitoring-target user A using color information of the face area image.

Here, the target user selection unit 120 may configure a discriminator based on a CNN, which receives face area images acquired from images at individual viewpoints and determines whether the received face images pertain to the same person, and may train the discriminator so as to determine whether multi-view images pertain to the same person. That is, after multi-view images of a monitoring-target user and multi-view images of another user are input, whether a corresponding multi-view image input is valid may be determined by a CNN-based discriminator that is trained for an attribute-specific 2D image given as ground truth and an inferred attribute-specific 2D image.

Also, the target user selection unit 120 may be implemented differently depending on a system service method. From the aspect of a system, the system is configured for a single user, and monitoring of multiple users may be implemented in such a way that the procedure of steps, including the step performed by the down-conversion unit 130 and steps subsequent thereto, is performed in parallel for the respective multiple users selected in the target user selection unit, as shown in the example of users A, B and C in FIG. 3, whereby all of the users on the screen may be monitored. In the present invention, monitoring of a single user will be described for convenience of description.

The down-conversion unit 130 generates at least one attribute-specific 2D image 240 by mapping information about at least one attribute in the 3D space of the face area images 230 onto a 2D UV space.

Here, the UV space is generated through a UV mapping process, and the spatial information of a user face in the real 3D space is mapped to 2D plane information in the UV space. Here, UV mapping is known technology, and because a detailed description thereof may obscure the gist of the present invention, it will be omitted.

Here, a face may be mapped to any one of various shapes including a spherical shape, an ellipsoid shape, a cylindrical shape, and a cube shape.

For example, when the 3D shape of a face is represented as a mesh of triangular structures, each triangular mesh of the mesh structure may be represented as a face for defining the shape of the triangular mesh using the three vertices thereof. Here, the 3D vertices of a face define mapping relationships using 3D ray intersection with a sphere shape for UV mapping, and the 3D spatial information may be represented as 2D spatial information by defining the mapping relationship between the sphere (an example of UV mapping) and the 2D UV space. Here, 3D spatial information of a point located on the face, other than the vertices thereof, is represented using a Barycentric coordinate system, which is a method for interpolation between vertices of a triangular mesh, thereby having a correspondence relationship with a specific pixel in the UV space.

Here, the at least one attribute-specific 2D image may include a shape 2D image (uv_shape), in which the shape information in the 3D space of the face area images is stored in a color code format, and a color 2D image (uv_tex), in which the color information of the face area images is stored.

For example, when the 3D template model of the face intended to be represented in the system is defined and mapped onto the UV space through the above-described UV mapping, the shape information and color information configuring the appearance of the user face are respectively merged in the 2D UV space and represented as a single 2D image for shape and a single 2D image for color, regardless of the number of multi-view images that are input.

Referring to FIG. 3, 'uv_shape' 241 may be a 2D image in which information about the shape or geometry of the user in the 3D space is stored in a color code format. Also, 'uv_tex' 242 may be a 2D image in which information about the color of the surface of the face of the user is stored.

Also, optionally, at least one of a 2D normal image for representing detailed shape information and a 2D material image for representing the effect of illumination on color may be further included as an attribute-specific 2D image.

Also, in order to help understanding of the present invention, attribute-specific 2D images are simply described as attribute-specific 2D images for shape information and color information that can represent the appearance of a user, which are capable of being identified by a camera, but the present invention is not limited thereto. That is, additional 2D images for other attributes may be used as attribute-specific 2D images in order to more precisely recognize and detect face area images.

Meanwhile, when the above-described UV mapping process is performed, image pixels in the UV space are mapped to feature points on the surface of a face located in the 3D space.

For example, referring to FIG. 3, the locations of a nose in the respective multi-view face area images 231, 232 and 233 are mapped to different pixels due to the different viewpoints of the respective cameras relative of that of the user. However, in the uv_shape 241 and the uv_tex 242 acquired through UV mapping, the shape or color information of a feature point acquired from the three multi-view images may be represented by being mapped to a single specific pixel. This relationship is maintained even though the viewpoint of the camera relative to that of the user is changed. Also, the pixel indicating the nose in the uv_shape 241 and the pixel indicating the nose in the uv_tex 242 are pixels having the same coordinates. That is, the characteristics of the shape of the face, face movement information, and a change in the skin color may be immediately acquired merely by monitoring the value of a predefined specific pixel in the UV space, without the need to search the multi-view images.

Here, the value of each pixel in uv_shape 241 may be represented by normalizing the 3D spatial coordinates of a feature point on the face surface located in the 3D space to [0, 1] or [−1, 1], or uv_shape 241 may be represented as an image in a color code format through quantization of the normalized value.

Here, the value of each pixel in uv_tex 242 may represented by normalizing a color value, such as the skin color of the face surface, to [0, 1] or [−1, 1] and mapping the normalized value to a corresponding pixel in the UV space, or may be represented using a color value within a range [0, 255], which is output from a sensor.

Accordingly, for example, a thin face and a plump face may be differentiated from each other merely by comparing the characteristics of color code distribution in uv_shape.

Also, identification of individuals may performed in consideration of all of the characteristics of the shape of the face, a skin color, and the distinctive color of eyes, nose, or mouth using the color distribution in the two uv_shape and uv_tex images. That is, conventional face detection is configured to separately identify each part in a frontal view, a profile view, a view with a camera angle of 45 degrees, and the like, but in the UV space, such information may be easily and quickly processed by checking the shape and color information of the 2D space in which these different views are merged.

Furthermore, multi-view image analysis or detection of a change in a facial expression, which is complementarily used for liveness detection or anti-spoofing, may be quickly performed in such a way that, in response to the input of multi-view images, a distinctive change in the color caused by a change in the expression or a change in the color code caused by a change in the 3D position is detected using the values of the pixels in uv_shape and uv_tex in the UV space.

Meanwhile, referring again to FIG. 2, the analysis unit 140 generates user monitoring information by analyzing at least one attribute-specific 2D image.

Here, the user monitoring information may include at least one of identity information, face features, a head gesture, a 3D gaze, and an emotional state, which are various types of user information acquired through spatial analysis and time-series analysis based on information, the dimensionality of which is reduced to 2D. The analysis unit 140 will be described in detail later with reference to FIG. 6.

The AI interaction service 30 may provide user-customized intelligent interaction service based on the user monitoring information generated by the analysis unit 140, that is, at least one of the identity, characteristics, state, and intention of the user.

Here, the AI interaction service 30 may selectively use information about the number and arrangement of cameras, which is input depending on service requirements and conditions, and the user monitoring information inferred by the apparatus 100 for monitoring a user based on multi-view face images.

Figure 4:
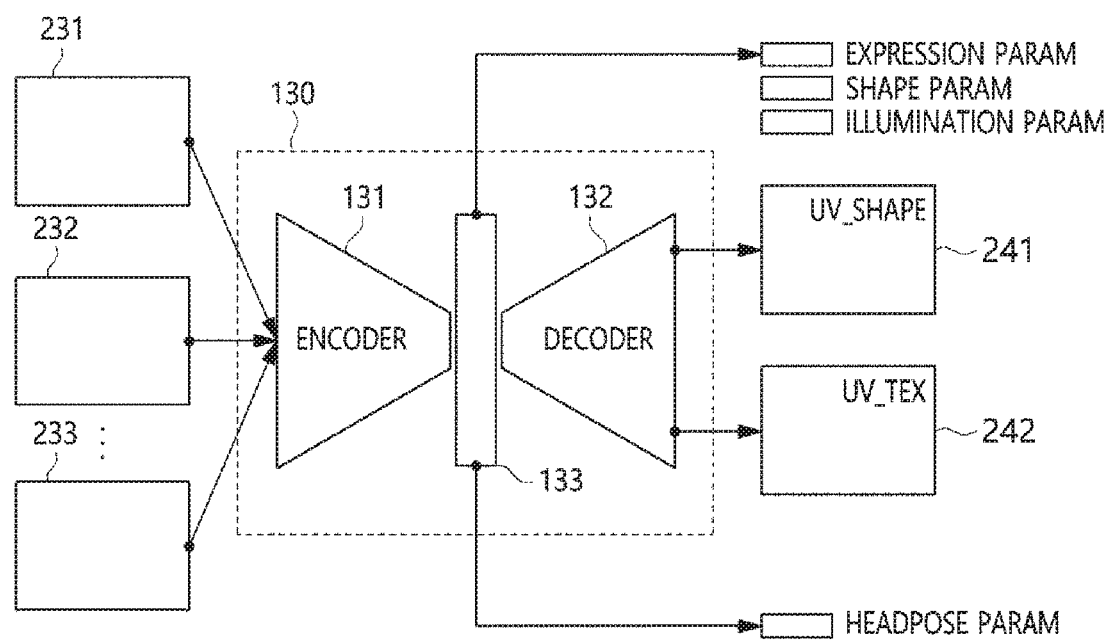
FIG. 4 is a specific block diagram of a down-conversion unit according to an embodiment.
Figure 5:
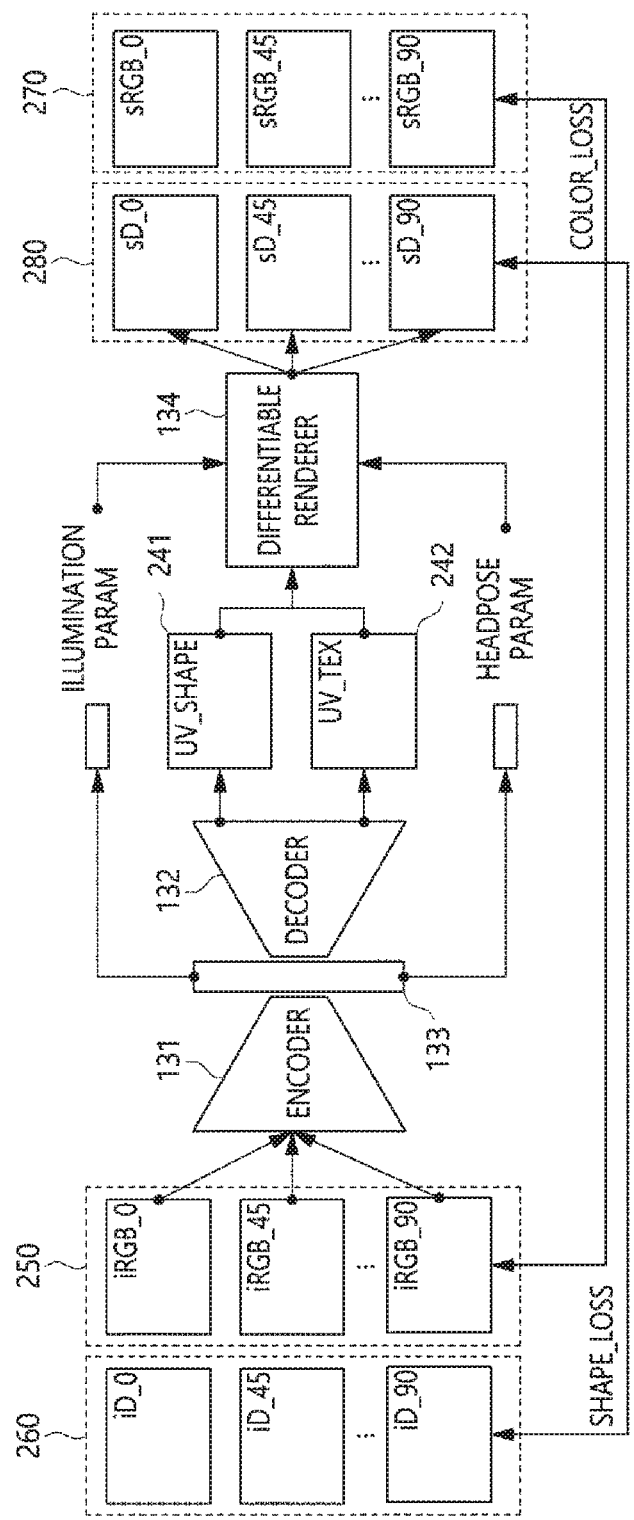
FIG. 5 is a view for explaining unsupervised learning for implementing a down-conversion unit according to an embodiment.

FIG. 4 is a specific block diagram of a down-conversion unit according to an embodiment, and FIG. 5 is a view for explaining unsupervised learning for implementing a down-conversion unit according to an embodiment.

Referring to FIG. 4, the down-conversion unit 130 is generated based on a Convolutional Neural Network (CNN) algorithm, and may include an encoder 131 and a decoder 132.

The encoder 131 may parameterize characteristics extracted from the face area images 231, 232 and 233.

For example, the characteristics of a face, including at least one of the characteristics of the shape of a face, a facial expression, the pose of the face, the color of the face, and illumination, which are capable of being inferred from the multi-view face area images 231, 232 and 233, may be parameterized.

The decoder 132 may generate one or more attribute-specific 2D images 241 and 242 based on the characteristic parameters output from the encoder 131. For example, referring to FIG. 4, the decoder 132 may generate target images, that is, 2D images of uv_shape 241 and uv_tex 242, using the parameterized one-dimensional information output by the encoder 131.

Here, the decoder 132 may be separated so as to correspond to each of the attribute-specific 2D images, or may be configured as a single neural network for all of the attribute-specific 2D images.

For example, referring to FIG. 4, the decoder 132 may have separate respective forms for uv_shape 241 and uv_tex 242. However, because the shape and color of a face, corresponding to information about the appearance thereof in the 3D space, have a one-to-one correspondence relationship between uv_shape 241 and the uv_tex 242, it may be desirable to configure a single neural network for uv_shape 241 and uv_tex 242, rather than to configure respective neural networks therefor.

Accordingly, a neural network is configured such that the shape characteristics and the color characteristics are learned in a complementary manner, whereby the cost of constructing the neural network is reduced and the efficiency of neural network training and inference speed may be improved. Also, departing from a stereotypical and limited range of representation of the shape/color of a face by an existing linear interpolation method, such as a 3D Morphable Model (3DMM), nonlinear learning and inference become possible using the nonlinear characteristics of a CNN such that the shape and color characteristics of training data are sufficiently reflected. Also, the shape characteristics and the color characteristics are made to appear consistently in the UV image by performing shape decoding and color decoding in a single neural network, whereby the reliability of user information collection may be improved.

This may be confirmed in an ill-posed problem of image-based 3D reconstruction in a photorealistic 3D reconstruction field in a computer-vision field. That is, when a surface having similar colors, such as a face, is reconstructed in 3D, the reconstructed 3D shape has more solutions than the actual 3D shape of the face, and when these multiple solutions are reprojected onto multi-view images, an identical color may be reproduced. That is, because a 3D shape that can generate the same multi-view images may have multiple solutions, rather than a single solution, when a 3D shape and a surface color are learned separately using individual networks, the results of training may be different from each other, as in the above example. However, when a 3D shape and a surface color are trained using the same neural network, as in the present invention, because training for these characteristics is performed by cross-referencing the ground truth of uv_shape and uv_tex, which are given as learning objectives, the time taken for the result of training to converge on a single solution may be reduced.

When the CNNs of the encoder 131 and the decoder 132 are configured, the number of layers in the CNN, the depth of the channel thereof, the form thereof, and the like may be changed depending on the purpose of use thereof, a required precision level, and the like.

Referring again to FIG. 4, the down-conversion unit 130 may further include a latent layer 133 for extracting at least one of characteristic parameters including a shape parameter, an expression parameter, an illumination parameter, and a head pose parameter by additionally transforming or processing the characteristic parameters, output from the encoder 131, for each characteristic.

Meanwhile, as described above, the down-conversion unit 130 is generated through training based on a convolutional neural network. According to an embodiment, the down-conversion unit 130 may be generated through training including a supervised learning step and an unsupervised learning step.

Here, at the supervised learning step, the convolutional neural network receiving face area images is trained so as to output at least one attribute-specific 2D image by mapping information about at least one attribute in the 3D space onto the 2D UV space.

That is, the CNN is trained for the characteristic to be output depending on the intention of a system designer. To this end, a 3D appearance including the shape and color of a face is reconstructed using multi-view images based on the conventional 3D reconstruction technology in a computer vision field, and is then transformed into the forms of uv_shape and uv_tex. Then, uv_shape and uv_tex are set as true values, and supervised learning is performed in order to make it possible for the network to infer the same uv_shape and uv_tex and parameters, such as a head pose and the like, from the multi-view images.

However, the above-described supervised learning has disadvantages in that it is complex to generate training data and a lot of cost and time are consumed therefor.

Therefore, according to an embodiment, the CNN trained through the supervised learning may be secondarily trained through unsupervised learning using a greater amount of data at low cost, whereby the performance of the system may be improved.

Here, at the unsupervised learning step, training may be performed so as to minimize the differences between multi-view face color images and rendered multi-view color images. Here, the rendered multi-view color images may be acquired by rendering an attribute-specific 2D image, which is output from the convolutional neural network trained through supervised learning by inputting the multi-view face color images thereto.

Here, at the supervised learning step, the convolutional neural network is trained so as to output at least one of characteristic parameters, including an illumination parameter and a head pose parameter, by additionally transforming or processing the characteristic parameters, extracted from the face area image, for each characteristic, and at the unsupervised learning step, rendering may be performed by inputting the illumination parameter and the head pose parameter along with the multi-view face color images.

That is, referring to FIG. 5, unsupervised learning uses multi-view color images 250 and depth images 260 of a face captured by cameras at the respective viewpoints, but does not require manual tagging by a user or 3D reconstruction, unlike supervised learning.

Here, the depth images 260 may be used for training without special processing thereof when the depth images are generated through an RGBD camera that provides both an RGB color and a depth, such as Microsoft's Kinect, Intel's RealSense, or the like.

However, when a camera that provides only RGB colors is used, a depth image at each viewpoint may be generated based on calculation through a conventional multi-view stereo reconstruction method or the like, whereby the depth images 260 may be acquired.

The secondary training may be alternatively performed using only the multi-view color images 250, without inputting the multi-view depth images 260. In this case, performance may be limited by the above-described ill-posed problem of photorealistic 3D reconstruction, compared to the case where the depth images are used along with the color images. However, there may be an advantage in that limits on camera input are overcome.

In an embodiment, it is assumed that multi-view color images are input to the encoder-decoder when unsupervised learning is performed. However, when the amount of memory of the system in which the neural network is to be run is sufficient, depth images may be additionally used, in which case training may be performed in the same manner.

Referring to FIG. 5, uv_shape, uv_tex, head_pose, and illumination_param, inferred by the encoder 131 and the decoder 132, are input to a differentiable renderer 134, and rendered color images 270 and rendered depth images 280, which have the same viewpoints as the input images, are generated by performing rendering using information inferred through training.

In the case of unsupervised learning, training is performed such that the color loss between input and output and the shape loss therebetween are minimized, and based thereon, the encoder 131 and the decoder 132 may infer the various 3D appearances of a user, input from multi-view images, in a nonlinear manner.

Here, the unsupervised learning step may be performed based on a typical CNN deep-learning algorithm, through which training is performed so as to minimize color loss and shape loss, or on a Generative Adversarial Network (GAN) algorithm, which additionally uses a discriminator network for classifying a combination of color images and rendered color images 250-270 and a combination of depth images and rendered depth images 260-280 as real or fake.

Here, training is performed such that the color image 270 and depth image 280 generated by the learning machine become indistinguishable from the input color image 250 and the input depth image 260, such that a learning error is backpropagated to the dimension-reducing transformation CNN through the renderer 134, and such that the parameters of the network are changed so as to minimize the error.

Meanwhile, not all training data for supervised learning or unsupervised learning needs to be configured with multi-view images. That is, a single-view image, images captured from two viewpoints, or images captured from N viewpoints may be arbitrarily input, and through this input control, the convolutional neural network may be trained so as to infer a consistent result regardless of the number of multi-view images input thereto.

For example, for uv_shape and uv_tex generated from three multi-view images, a neural network may be trained so as to infer the uv_shape and the uv_tex by receiving only a single-view image. Through this training, even though an image is input from a single camera in the actual environment in which a system provides service, image information in a hidden region, which cannot be acquired at the viewpoint of the camera due to self-occlusion, may be inferred based on the correlation between pieces of data that is learned when training is performed.

Such results inferred without actual data input are provided in the form of a UV probability map having the same resolution as uv_shape and uv_tex (the UV probability map representing the reliability of data inferred for each pixel as a probability value in the range of [0, 1]), whereby the following user-information monitoring module may refer to the reliability of the inferred value when it uses information of uv_shape and uv_tex.

Figure 6:
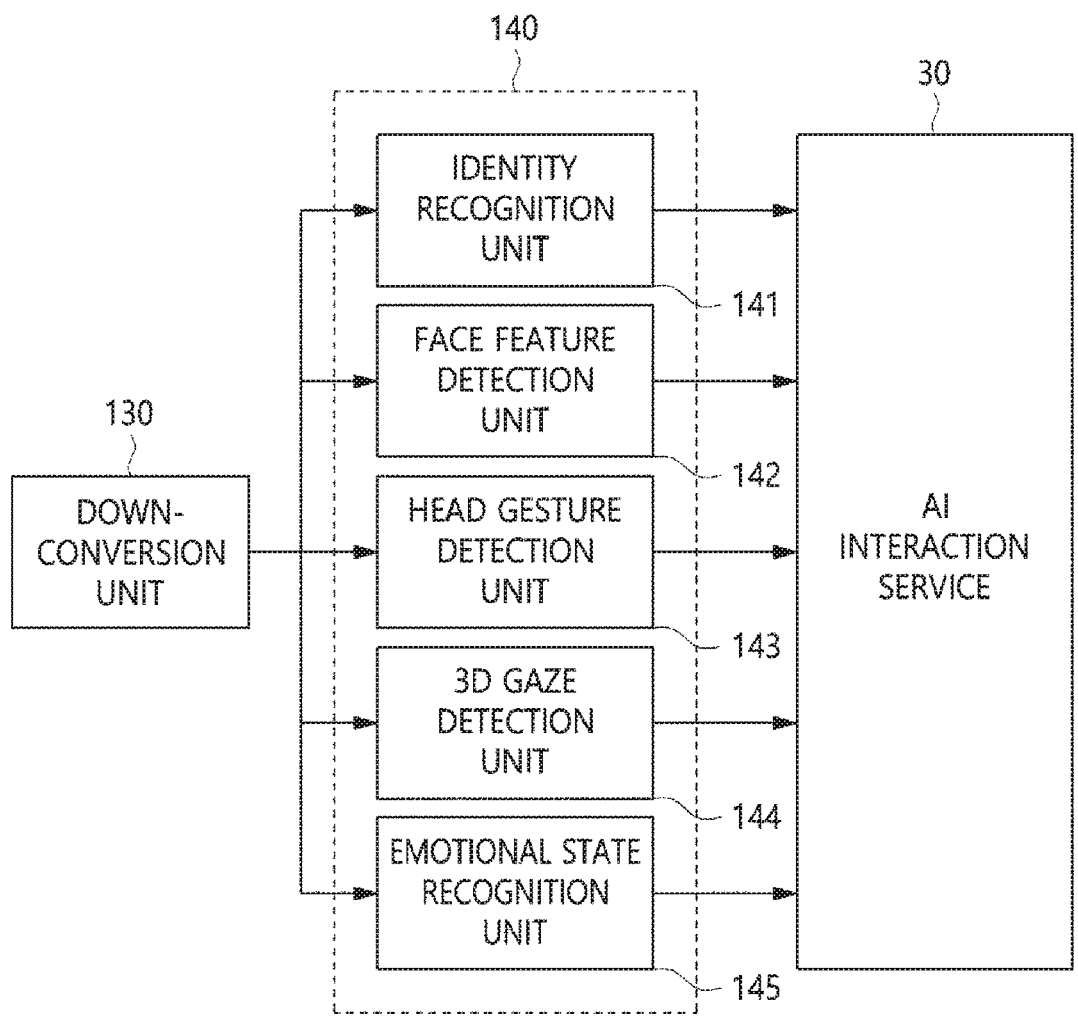
FIG. 6 is a specific block diagram of an analysis unit according to an embodiment.

FIG. 6 is a specific block diagram of an analysis unit according to an embodiment.

Referring to FIG. 6, the analysis unit 140 may include at least one of an identity recognition unit 141, a face feature detection unit 142, a head gesture detection unit 143, a 3D gaze detection unit 144, and an emotional state recognition unit 145.

The identity recognition unit 141 identifies a user based on the similarity between an attribute-specific 2D image and an attribute-specific 2D image previously registered for each user.

For example, the identity recognition unit 141, which is capable of identification in order to provide user-customized interaction, may perform identification using one or more attribute-specific 2D images in the UV space including uv_shape and uv_tex of a user, which are inferred for each frame. In this case, when a new user is registered, at least one attribute-specific 2D image in the UV space pertaining to the user is registered, and the user may be identified through comparison with information of other users.

Basically, a conventional method in which identification is performed using the similarity between a frontal or profile view image input from a camera and a registered frontal or profile view image is maintained from the aspect of computation by replacing the frontal or profile view images with attribute-specific 2D images of the UV space, and identification using not only the color information of the multi-view images but also the 3D shape information of the user may be possible.

Here, compared to a conventional linear method, such as a 3DMM or the like, the decoder network of the present invention is capable of performing training for nonlinear characteristics for the unique 3D appearance of a user, thereby facilitating identification.

Also, when stricter identification is required, a user is requested to make any of various facial expressions or to pronounce a specific word (e.g., a name) selected by the user at the time of registration, and attribute-specific 2D image information of a frame, the attribute-specific 2D image of which has a distinctive change, is stored as a characteristic in connection with the facial expression or pronunciation. Then, when a service is provided, the user is requested to make the corresponding facial expression or to pronounce the corresponding word (e.g., a name), and a change in the attribute-specific 2D images is compared with the stored information. In this manner, variation in the images of a time-series comprising a few frames is analyzed, or such analysis is additionally performed along with the above-described identification method, whereby stricter user identification may be provided.

This identification method may simplify monitoring of spatiotemporal multi-view image information to monitoring of changes in the values of pixels in attribute-specific 2D images, thereby enabling real-time processing. Also, multiple conditions, such as a facial expression, pronunciation, and the like of a user, are registered, and the user is requested to satisfy a randomly selected condition when identification is performed, whereby liveness detection or anti-spoofing may be provided.

Additionally, depending on the number of multi-view cameras available in the service and on the characteristics of the viewpoints (e.g., input of a side view), training is performed while changing the number of input multi-view images from a single image to multiple images in order to make the condition similar to the service condition when training for dimension-reducing transformation is performed, whereby inference of an attribute-specific 2D image reaches a certain level despite the limited image information. Accordingly, even when a single image in which information about a significant part of a face is lost, such as a profile view, is input at service time, an attribute-specific 2D image may be stably inferred, whereby identification performance may be improved.

Also, based on the rendering method of the training concept diagram in FIG. 5, a rendered image 270 (or rendered images 270 and 280) corresponding to the viewpoint of an input image is (are) immediately generated using previously registered uv_shape and uv_tex information of a user, and the rendered image is compared with the input image, whereby identification may be additionally performed according to service needs. This identification method based on rendering may compensate for learning characteristics that can be lost by a leveling-off effect in a dimensionality reduction process, may additionally perform identification through data matching with input data, and may enable a learning characteristic, through which the learning machine in FIG. 5 emulates input multi-view images according to a Generative Adversarial Network (GAN) learning method, to be used for identification without change. Particularly, this method may be advantageous to precise identification in a personalized service of a vehicle, a portable smart device, and the like.

Meanwhile, in order to improve the sensitivity of identification, a CNN discriminator is trained for an attribute-specific 2D image, corresponding to a ground truth, and an attribute-specific 2D image inferred after the multi-view images of a target user whose identity is to be verified and the multi-view images of another user are input, whereby the validity of the input multi-view images may be determined. Accordingly, the sensitivity of identification may be improved, and this may also be used when the target user selection unit 120 identifies a target user.

This identification method enables information for each user to be separately collected even in a service condition in which multiple users are present when a computer intends to provide user-customized service.

The face feature detection unit 142 detects face features by comparing an attribute-specific 2D image with an attribute-specific 2D image of a standard face type.

The face feature detection unit 142 may identify a face shape, such as an oval-shaped face or the like, the color of the lips, and the relative size/location of a nose, eyebrows, eyes, or the like, by comparing an attribute-specific 2D image inferred from multi-view images with the attribute-specific 2D image of a standard face type without the need to check the pixels corresponding to the face feature in the multi-view images one by one. That is, identification may be performed by comparing the color-coded 3D location value or color value of a specific pixel in the attribute-specific 2D image containing the corresponding feature with the color-coded 3D location values or color values of pixels adjacent to the specific pixel, as in the example of FIG. 3.

Also, whether a user wears glasses may be easily detected using the averaging characteristic of CNN learning.

Here, when images of the worn glasses are not the same as each other in all training data, the CNN learning machine may identify whether a user wears glasses by identifying the differential characteristic between an input image and a rendered image, which is acquired in such a way that uv_tex, inferred using uv_tex from which glasses are excluded, is rendered so as to correspond to the viewpoint of the input image using the rendering method of FIG. 5.

Also, in the case of a man, whether he has a mustache or beard may be identified in a similar manner. In the case of a woman, the color values of pixels in uv_tex corresponding to the eyes, lips, eyebrows, cheeks, and the like, are identified, whereby the color of makeup applied over each part of her face may be identified by checking the values of the predefined pixels in the single ux_tex image without retrieving the same from multi-view images.

The head gesture detection unit 143 detects a head gesture based on a head pose parameter.

The head gesture detection unit 143 may acquire head pose information of a face in each of multi-view images from the latent layer 133 of the encoder-decoder (131-132) structure of the down-conversion unit 130.

Because this is the output of the encoder 131, the orientation of a head based on a frontal pose (where a y axis is the direction from lips to eyes, a z axis is a forward direction, and an x axis is defined according to the right-hand rule) is inferred. Through time-series monitoring of the head pose, various motions, such as nodding the head, shaking the head, and the like, are recognized, whereby a gesture represented through movement of the face of the user may be recognized.

Here, because training for a head pose is performed such that a 3D shape based on the front of the user, which is decoded through training, goes through 3D transformation using an inferred head pose and matches the rotated 3D shape of the user in the captured image, even when a limited number of multi-view images or a single-view image is input, the head pose may be stably predicted, compared to when a head pose is predicted in the encoder through a conventional method. In this process, for the 3D shape of the user, images containing shape alterations, such as talking, smiling, grimacing, and the like, are included as targets of learning, whereby a head pose may be detected despite various changes in face shape as well as various changes in viewpoint.

The 3D gaze detection unit 144 detects a 3D gaze direction based on the head pose parameter and the color value of the eye area in uv_tex.

The 3D gaze detection unit 144 provides 3D gaze direction information about the point at which a user is gazing based on a reference coordinate system, which is set based on the frontal pose taken by the user, using head pose information and the color value of an eye area, inferred from uv_tex 242. A conventional eye-tracking method mainly uses eye-tracking based on appearance using the distribution of RGB values of an eye area in the input image. However, in the case of this appearance-based approach, when the viewpoint of a user relative to a camera is at an angle of 45 degrees or more, the appearance information pertaining to the eye area is lost due to self-occlusion, which sharply degrades the accuracy of eye-tracking.

However, in the case of uv_tex interred by the encoder-decoder structure of the present invention, information lost due to self-occlusion is acquired from another view image, in which self-occlusion does not occur, in a training process, whereby training is performed such that the appearance of the user is interred from uv_tex corresponding to a frontal view in which self-occlusion is resolved. Accordingly, even when a single-view image is input, the RGB value of an eye area that is lost due to self-occlusion may be inferred, and high eye-tracking accuracy may be maintained even when the viewpoint of the user relative to a camera is at an angle of 45 degrees or more. When multi-view images are simultaneously given, uv_tex is inferred using the RGB values of the image including no self-occlusion, whereby it is possible to provide eye-tracking accuracy higher than that provided when a single-view image is input. In the above two cases, the encoder-decoder may be configured in the same manner, and the number of multi-view input channels may be adjusted according to the service context.

The emotional state recognition unit 145 may recognize the emotional state of a user based on variation in an attribute-specific 2D image over time.

Here, the emotional state recognition unit 145 monitors variation in the attribute-specific 2D image, interred from input multi-view images, over time in order to enable interaction suitable for the emotional state of a user in the interaction situation by recognizing the emotional state predicted from the facial expression or gesture of the user.

Here, with regard to uv_shape, a change in the facial expression results in a change in the color code of pixels corresponding to each part of a face related to the expression, such as opening a mouth, smiling, or the like. Also, with regard to uv_tex, wrinkles appearing according to the facial expression or the like are represented as a change in the color of pixels corresponding to each part of the face in the UV space.

For example, smile lines between an upper lip and cheeks, which are noticeable when a user is smiling, are represented as a change in the color of the pixels corresponding to the smile lines in uv_tex. That is, image information that is lost due to self-occlusion by a user may be minimized through the input of multi-view images, and image analysis is performed by analyzing only a change in a color code (uv_shape) and a change in a color (uv_tex) in the two images uv_shape and uv_tex) acquired through dimension-reducing transformation performed on each of frames in a time series, regardless of the number of input multi-view images, whereby spatiotemporal changes of the user may be easily and quickly monitored. Accordingly, without the need to search multi-view images for visible information or to specially process overlapping face information, the emotional state of a user may be monitored only through image analysis in UV space having reduced dimensionality, without the loss of information that is frequently hidden depending on the movement of the user.

Referring again to FIG. 2, a CNN-based discriminator for receiving face area images acquired at respective viewpoints and determining whether the faces area images are of the same user is configured in the face detection unit 110, whereby training for the determination of whether multi-view images pertain to the same person may be performed.

Also, a CNN-based discriminator is configured to receives uv_shape and uv_tex, which are the results of transformation of 3D information to 2D information by the down-conversion unit 130, and is then trained so as to determine whether images include the same person. For all of the above two CNN-based discriminators, training may be performed by assigning a real or fake label depending on whether a combination of multi-view images includes the same person or different people. Also, for a frame that is input after images of the same person are sorted, on the assumption that an image can be acquired during a time period that is short enough to minimize the movement between frames, an image area may be updated through a conventional image-tracking technique based on the adjacency and color similarity between the image area of the current frame and the image area of the next frame, inferred by the face detection unit from multi-view images.

Figure 7:
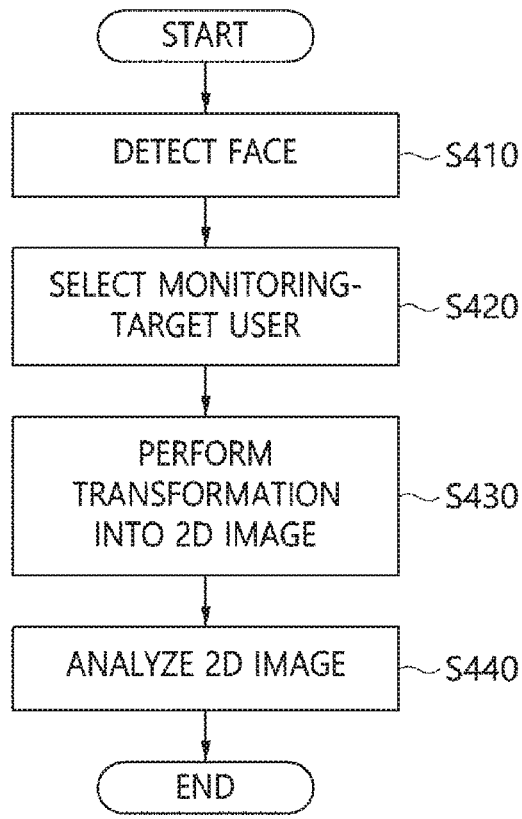
FIG. 7 is a flowchart for explaining a method for monitoring a user based on multi-view face images according to an embodiment.

FIG. 7 is a flowchart for explaining a method for monitoring a user based on multi-view face images according to an embodiment. Here, the method for monitoring a user based on multi-view face images is performed by the above-described apparatus for monitoring a user based on multi-view face images, and thus a repeated description will be omitted.

Referring to FIG. 7, the method may include extracting face area images from respective user images captured from two or more different viewpoints at step S410, transforming information about at least one attribute in the 3D space of the face area images to at least one attribute-specific 2D image by mapping the same onto a 2D UV space at step S430, and generating user monitoring information by analyzing the at least one attribute-specific 2D image at step S440.

Here, the method may further include selecting a monitoring-target user from the extracted face area images at step S420 after extracting the face area images at step S410 and before generating the user monitoring information at step S430.

Here, the method may further include determining whether users included in the user images captured at the two or more different viewpoints are the same user using a convolutional neural network.

Here, transforming the information about the at least one attribute in the 3D space to the at least one attribute-specific 2D image at step S430 may be performed based on a convolutional neural network algorithm, and may include parameterizing characteristics extracted from the face area images and generating the at least one attribute-specific 2D image based on characteristic parameters.

Here, the attribute-specific 2D image may include a 2D image for shape (uv_shape) in which shape information in the 3D space of the face area images is stored in a color code format and a 2D image for color (uv_tex) which the color information of the face area images is stored.

Here, transforming the information about the at least one attribute in the 3D space to the at least one attribute-specific 2D image at step S430 may further include additionally transforming or processing the characteristic parameters for each characteristic, thereby extracting at least one of the characteristic parameters, including a shape parameter, an expression parameter, an illumination parameter, and a head pose parameter.

Here, generating the user monitoring information at step S440 may include at least one of identifying a user based on the similarity between an attribute-specific 2D image and an attribute-specific 2D image previously registered for each user, detecting a face feature by comparing the attribute-specific 2D image with an attribute-specific 2D image of a standard face type, detecting a head gesture based on the head pose parameter, detecting a 3D gaze direction based on the head pose parameter and the color value of the eye area in uv_tex, and recognizing the emotional state of the user based on the variation in the attribute-specific 2D image over time.

Figure 8:
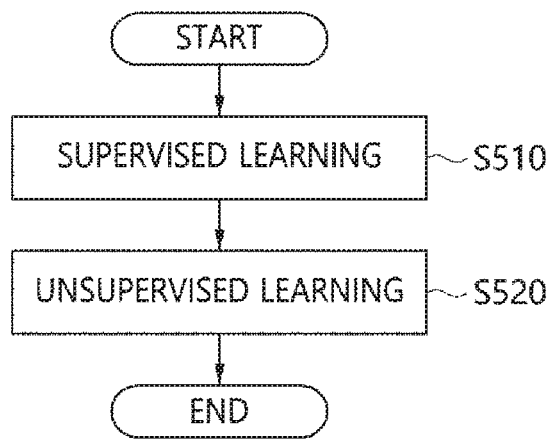
FIG. 8 is a flowchart for explaining a convolutional-neural-network teaming method according to an embodiment.

FIG. 8 is a flowchart for explaining a convolutional neural network learning method according to an embodiment. In the description of the convolutional neural network learning method, content that was described with reference to FIG. 5 will be omitted below.

Referring to FIG. 8, a convolutional neural network may be generated by performing supervised learning at step S510 such that the convolutional neural network, receiving face area images, outputs at least one attribute-specific 2D image by mapping information about at least one attribute in a 3D space onto a 2D UV space, and performing unsupervised learning at step S520 so as to minimize the differences between multi-view face color images and rendered multi-view color images acquired by rendering the attribute-specific 2D image that is output from the convolutional neural network trained through supervised learning by inputting the multi-view face color images thereto.

Here, performing supervised learning at step 510 is configured to train the convolutional neural network to output at least one of characteristic parameters, including an illumination parameter and a head pose parameter, by additionally transforming or processing the characteristic parameters, extracted from the face area images, for each characteristic, and performing unsupervised learning at step S520 may be configured to perform rendering by receiving the illumination parameter and the head pose parameter along with the multi-view face color images.

Here, unsupervised learning at step S520 may be performed based on a typical algorithm for minimizing the loss of the CNN and a Generative Adversarial Network (GAN) algorithm.

Figure 9:
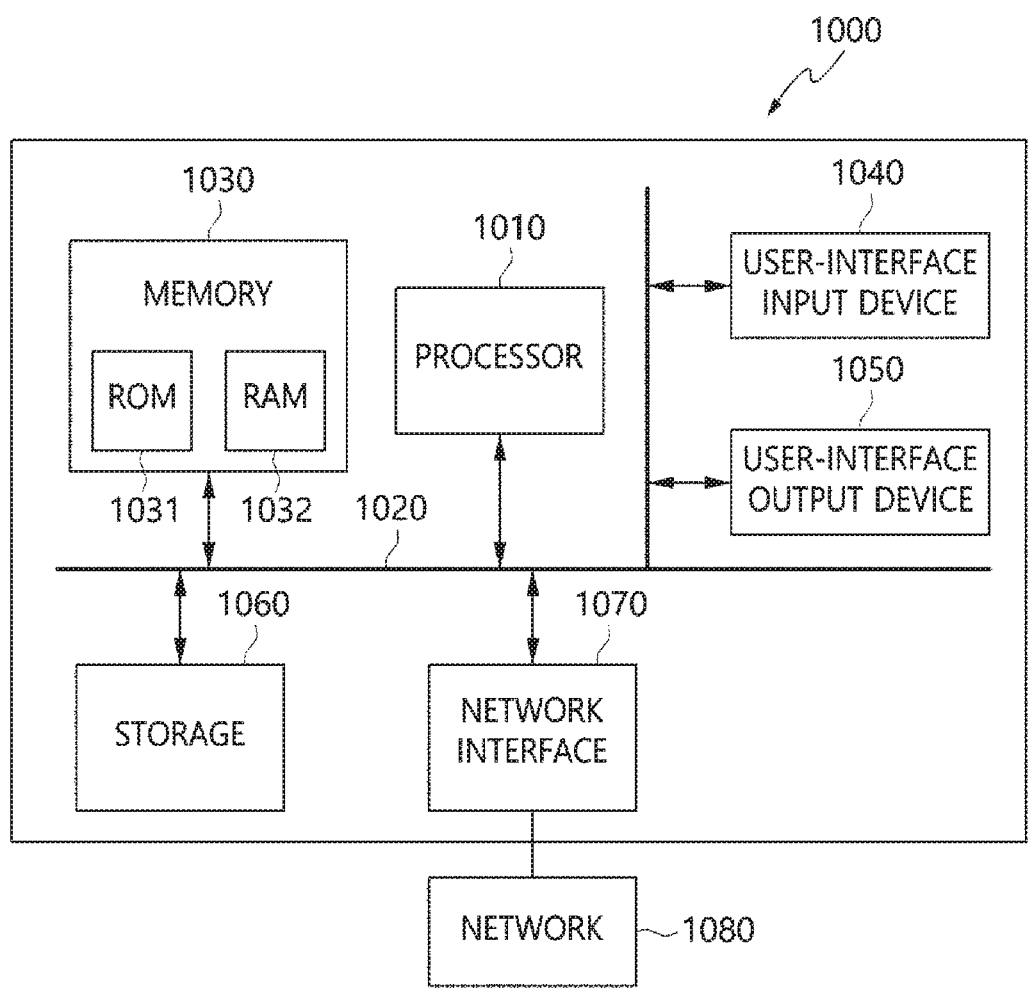
FIG. 9 is a view illustrating a computer system configuration according to an embodiment.

FIG. 9 is a view illustrating a computer system configuration according to an embodiment.

Each of the apparatus for monitoring a user based on multi-view face images and a learning device according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

Herein above, the configuration of the present invention was described through the above specific methods and embodiment.

According to the present invention, a computer may analyze, in real time, multi-view images input through multiple cameras, and may collect information such as the identity, characteristics, state, intention, and the like of a user on the spot in real time without restriction on the movement of the user, whereby intelligent interaction suitable for the context and intention of the user may be provided for vehicle driving assistance, a learning aid, concierge service, and the like in various industrial fields.

The present invention relates to a method for monitoring a user based on image analysis in order to enable a computer to perform intelligent interaction with the user in a face-to-face AI service based on information (the identity, characteristics, expression, gaze direction, gesture, and the like of the user) capable of being acquired from the face of the user by collecting and analyzing, in real time, multi-view or multi-viewpoint face images of the user acquired from an image sensor installed in the computer or image sensors arranged in the space.

A difference from existing similar inventions is to enable more intelligent services to be provided by monitoring the identity, characteristics, state, intention, and the like of a user in real time through real-time analysis of changes in the color and shape of a face in a 3D space with a low computational load by transforming multi-view images, which are captured by multiple cameras while allowing the user to freely move during an interaction process without requiring a restrictive pose, such as looking straight ahead, based on learning such that information in the 3D space is transposed to a UV space, which is a 2D space acquired through dimensionality reduction of the 3D space, regardless of the number of cameras that are used. A conventional computational photography method in a computer vision field requires a high computational load because information of multi-view images is analyzed through 3D reconstruction of the input multi-view images by identifying self-occlusion in each viewpoint image, selecting and collecting visible information, and collecting information visible from multiple views. Also, learning-based methods for identification, eye-tracking, and the like have limitations as to user experience (UX) because they request predefined conditions for learning (e.g., a full face and no movement) from users.

In the automotive field, the role of a driver and behavior of the driver in a vehicle are expected to significantly change with recent technological developments such as autonomous driving. With regard to driving, technologies such as vehicle function control through recognition of a hand gesture, monitoring whether a driver is dozing through eye-tracking, and the like, are currently applied. These are methods for enabling a computer to interact with a user and monitor the user when the user is driving a vehicle while keeping his/her eyes on the road. With the development of autonomous driving, the target of interaction is changed from a driver to a passenger, and a behavior pattern in a vehicle will be changed to, for example, viewing content in the vehicle or the like. In this case, because the conventional method for interaction with a driver who keeps his/her eyes on the road is no longer adequate to monitor a user, analysis of input multi-view images will be required. The present invention may provide a method for detecting the intention of a passenger according to the identity thereof and monitoring the state of the passenger in spite of free movement of the passenger in a vehicle by performing real-time analysis of information of multi-view images collected from multiple cameras installed in the vehicle.

In a learning-related field, online learning has been increasingly adopted because of the recent development of network technology and display devices and expansion of contactless culture. A conventional method is configured to monitor a user in a uniform manner by analyzing the concentration level of a user who is looking straight at a monitor for learning or by analyzing the input pattern of the user in a digital learning process. When the present invention is applied to this monitoring process, an AI tutor is able to provide user-customized learning and enhanced learning-monitoring by determining the identity of a user and monitoring the user's concentration on learning and comprehension of learning in real time using only a single camera installed in a tablet PC in the state in which a restriction on the movement of the user is relieved while learning is in progress.

In a service industry field including a hotel, an exhibition hall, an airport, a shopping mall, and the like, in order to provide user-customized face-to-face service, including information or concierge service, curation, and the like, the present invention quickly collects information about the intention and state of a user by efficiently collecting information from a large area and different directions using multi-view images, unlike the conventional methods, whereby customized service desired by the user may be provided.

In the case of offline stores, information about an object in which a user visiting a store is interested may be collected using multiple cameras installed in the store, and based on the collected information, and an item that fits the need of the user may be recommended or the taste of the user may be reflected in future online service according to the characteristics of the user.

In the case of access control, unlike a conventional method used in face recognition or iris recognition, in which the movement of a user is restricted so as to look straight ahead or approach a camera, making an expression, moving a gaze, or the like is remotely requested and analyzed in an interactive manner in a natural user state when a user is walking, looking at the side, or the like), whereby a method enabling both falsification detection and stricter identification may be provided.

Additionally, when autism, developmental disorders, or the like are screened or diagnosed, analysis of multi-view images input from multiple cameras installed in a laboratory may be used in order to collect information about the state of an examinee or whether the examinee interacts with the diagnostician in response to a request from the diagnostician.

In addition to the above application fields, the present invention may be used in various fields providing face-to-face service or user-monitoring service based on AI. Here, the present invention may be used in order for a computer to provide intelligent interactive service suitable for the context of a user through real-time user monitoring for detection of the identity, state, intention, and the like of the user without information loss caused by movement of the user.

According to the disclosed embodiment, a user may be monitored even when the user takes a free pose including looking at a camera from an angle of 45 degrees or more relative to the camera, rather than being in a general frontal view state in which the user looks straight at the camera or looks at the camera from an angle less than 45 degrees relative to the camera.

According to the disclosed embodiment, it is possible to solve the problem of an excessive amount of information when a user is monitored based on a plurality of multi-view images.

Also, the disclosed embodiment may solve the problem of a high computational load imposed by monitoring a user using a 3D spatial operation.

The disclosed embodiment may enable a deep-learning operation to be applied even when a user takes a free pose including looking at a camera from an angle of 45 degrees or more relative to the camera, rather than being in a general frontal view state in which the user looks straight at the camera or looks at the camera from an angle less than 45 degrees relative to the camera.

Accordingly, the embodiment enables monitoring of a user in real time based on multi-view face images even in an embedded environment, thereby enabling a computer to perform intelligent interaction with the user.

Although the embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for monitoring a user based on multi-view face images, comprising:
   memory in which at least one program is recorded; and
   a processor for executing the program, wherein the program comprises:
     a face detection unit for extracting face area images from respective user images captured from two or more different viewpoints;
     a down-conversion unit for generating at least one attribute-specific 2D image by mapping information about at least one attribute in a 3D space of the face area images onto a 2D UV space; and
     an analysis unit for generating user monitoring information by analyzing the at least one attribute-specific 2D image,
   wherein the down-conversion unit is generated based on a convolutional neural network algorithm, and
   wherein the down-conversion unit includes an encoder for parameterizing characteristics extracted from the face area images and a decoder for generating the at least one attribute-specific 2D image based on characteristic parameters.

2. The apparatus of claim 1, wherein the program further comprises:
   a target user selection unit for selecting a monitoring-target user from the extracted face area images after extraction of the face area images and before generation of the user monitoring information.

3. The apparatus of claim 1,
   wherein the program determines whether users included in the user images captured from the two or more different viewpoints are a same user based on a convolutional neural network.

4. The apparatus of claim 1,
   wherein the attribute-specific 2D image includes a shape 2D image (uv_shape) in which shape information in the 3D space of the face area images is stored in a color code format and a color 2D image (uv_tex) in which color information of the face area images is stored.

5. The apparatus of claim 4,
   wherein the down-conversion unit further includes a latent layer for extracting at least one of the characteristic parameters, including a shape parameter, an expression parameter, an illumination parameter, and a head pose parameter, by additionally transforming or processing the characteristic parameters for each characteristic.

6. The apparatus of claim 5, wherein the analysis unit includes at least one of:
   an identity recognition unit for identifying the user based on a similarity between the attribute-specific 2D image and an attribute-specific 2D image that is previously registered for each user;
   a face feature detection unit for detecting a face feature based on a comparison of the attribute-specific 2D image with an attribute-specific 2D image of a standard face type;
   a head gesture detection unit for detecting a head gesture based on the head pose parameter;
   a 3D gaze detection unit for detecting a 3D gaze direction based on the head pose parameter and a color value of an eye area in uv_tex; and
   an emotional state recognition unit for recognizing an emotional state of the user based on a variation in the attribute-specific 2D image over time.

7. A method for monitoring a user based on multi-view face images, comprising:
   extracting face area images from respective user images captured from two or more different viewpoints;
   transforming information about at least one attribute in a 3D space of the face area images to at least one attribute-specific 2D image by mapping the information onto a 2D UV space; and
   generating user monitoring information by analyzing the at least one attribute-specific 2D image,
   wherein transforming the information about the at least one attribute in the 3D space is performed based on an algorithm of a convolutional neural network, and
   wherein transforming the information about the at least one attribute in the 3D space includes parameterizing characteristics extracted from the face area images and generating the at least one attribute-specific 2D image based on characteristic parameters.

8. The method of claim 7, further comprising:
   after extracting the face area images and before generating the user monitoring information, selecting a monitoring-target user from the extracted face area images.

9. The method of claim 7, further comprising:
determining whether users included in the user images captured from the two or more different viewpoints are a same user based on a convolutional neural network.

10. The method of claim 7,
wherein the attribute-specific 2D image includes a shape 2D image (uv_shape), in which shape information in the 3D space of the face area images is stored in a color code format, and a color 2D image (uv_tex), in which color information of the face area images is stored.

11. The method of claim 10,
wherein transforming the information about the at least one attribute in the 3D space further includes extracting at least one of the characteristic parameters, including a shape parameter, an expression parameter, an illumination parameter, and a head pose parameter, by additionally transforming or processing the characteristic parameters for each characteristic.

12. The method of claim 11, wherein generating the user monitoring information includes at least one of:
identifying the user based on a similarity between the attribute-specific 2D image and an attribute-specific 2D image that is previously registered for each user;
detecting a face feature based on a comparison of the attribute-specific 2D image with an attribute-specific 2D image of a standard face type;
detecting a head gesture based on the head pose parameter;
detecting a 3D gaze direction based on the head pose parameter and a color value of an eye area in uv_tex; and
recognizing an emotional state of the user based on a variation in the attribute-specific 2D image over time.

13. The method of claim 7, wherein the convolution neural network is generated by:
performing supervised learning such that the convolutional neural network, receiving the face area images, outputs the at least one attribute-specific 2D image corresponding to the 2D UV space, onto which the information about the at least one attribute in the 3D space is mapped, and
performing unsupervised learning so as to minimize a difference between multi-view face color images and rendered multi-view color images acquired by rendering the attribute-specific 2D image that is output from the convolutional neural network trained through supervised learning by inputting the multi-view face color images thereto.

14. The method of claim 13,
wherein performing the supervised learning is configured to train the convolutional neural network so as to output at least one of the characteristic parameters, including an illumination parameter and a head pose parameter, by additionally transforming or processing the characteristic parameters, extracted from the face area images, for each characteristic, and
wherein performing the unsupervised learning is configured to perform rendering by inputting the illumination parameter and the head pose parameter along with the multi-view face color images.

* * * * *